Jan. 15, 1952 A. L. FREEMAN Re. 23,449
ELECTRIC INTERNAL-COMBUSTION ENGINE HEAD BOLT HEATER
Original Filed Nov. 4, 1946
Fig. 1.
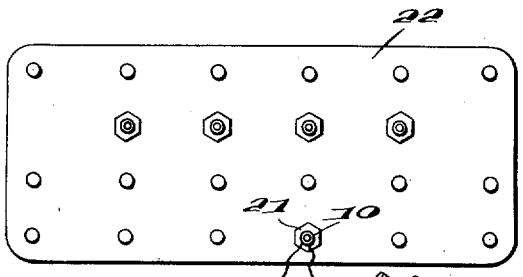
Fig. 2.
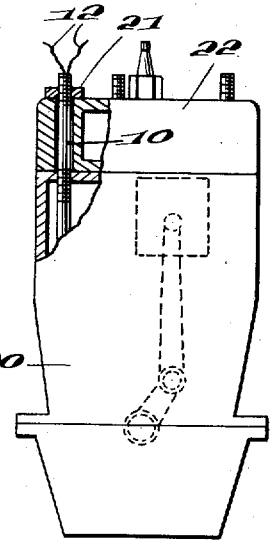
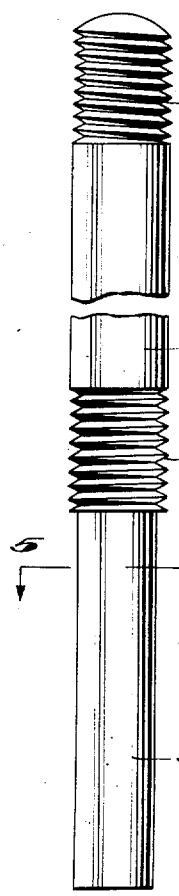
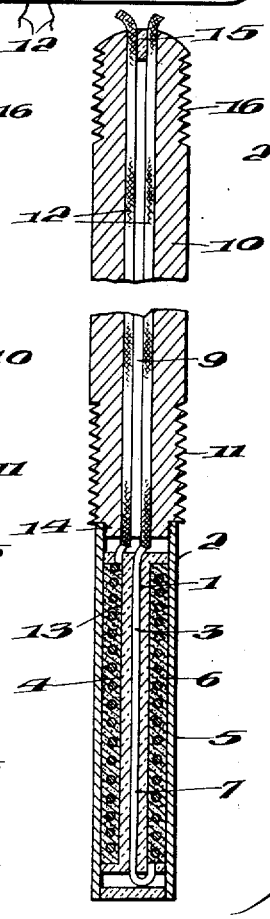
Fig. 5.
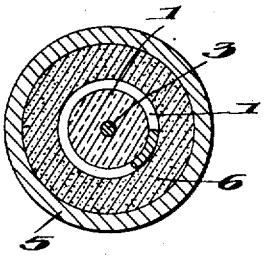
Fig. 3. Fig. 4.
INVENTOR
ANDREW L. FREEMAN,
BY
Bailey, Stephens & Huettig
ATTORNEYS Reissued Jan. 15, 1952

Re. 23,449

UNITED STATES PATENT OFFICE 23,449

ELECTRIC INTERNAL-COMBUSTION ENGINE HEAD BOLT HEATER

Andrew L. Freeman, Grand Forks, N. Dak.

Original No. 2,487,326, dated November 8, 1949, Serial No. 84,363, March 30, 1949, which is a continuation of Serial No. 707,695, November 4, 1946. Application for reissue November 6, 1951, Serial No. 255,092

9 Claims. (Cl. 219—19)

Matter enclosed in heavy brackets [ ] appears in the original patent but forms no part of this reissue specification; matter printed in italics indicates the additions made by reissue.

The invention relates to a heating device for liquid cooled internal combustion engines.

This application is a continuation of my application Serial No. 707,695, filed November 4, 1946, *which application has now become abandoned.*

As is well known, in cold weather the lubricants used in internal combustion engines become thick and do not flow readily, thus making the starting of an engine very difficult, and causing an excessive drain on the battery.

It is, therefore, an object of this invention to provide a device which can be inserted into the head of a cylinder block to heat the liquid cooling medium.

A further object of the invention is to provide a heating device which can be substituted for one of the conventional head bolts, and which will serve both for heating the cooling fluid and as one of the head bolts for securing the head to the cylinder block.

Another object of the invention is to provide a heating device which does not require the drilling of a special hole in the engine for its installation.

A further object of the invention is to provide a heating device which can be left in the engine at all times and which can be readily connected to a suitable source of current for its operation.

Further objects and advantages of the invention will appear more fully from the following description, especially when taken in conjunction with the accompanying drawings which form a part thereof.

In the drawings:

Fig. 1 is a plan view of the head of a cylinder block having a heating unit embodying the invention mounted therein;

Fig. 2 is a side view of a cylinder block *partly in section* with a heating unit mounted therein;

Fig. 3 is a side view of the heating unit;

Fig. 4 is a sectional view, longitudinal of the heating unit; and

Fig. 5 is a sectional view taken on the line 5—5 of Fig. 3.

Referring to the drawings, the heating unit as shown comprises a porcelain arbor 1 having a head 2 and a hole 3 therethrough. Wound about the arbor 1 is a coil of nickel chrome wire 4, or similar high resistance wire, which is held to the arbor 1 and insulated from a copper tube casing 5 by cement of the Sauer-Eisen type, denoted by the numeral 6.

Passing through the hole 3 in arbor 1 is a wire terminal 7 which is secured at its lower end by suitable solder to one end of the coil 4. The upper portion of the wire 7 is covered with an asbestos or other insulating material as shown at 8, which passes through a hole 9 in a sleeve or bolt 10, the latter being threaded at 11 for connection to the head of a cylinder block. A similar insulated wire 12 is connected through a hole in the arbor head 2 to the other end of the coil 4 as shown at 13.

The bolt 10 has a reduced portion at 14 which tightly fits into the copper casing and is secured thereto by a suitable solder.

The two wires 8 and 12 pass through the hole 9 and out the upper end thereof, the wires being sealed to the upper end of the bolt by a suitable insulating cement as shown at 15. After passing from the bolt the two wires are preferably connected to a male plug to make a connection to a suitable source of power, such as a 110 volt A. C. or D. C. source.

The upper end of sleeve 10 is threaded, as shown at 16. Threads 11 and 16 are of opposite pitch, and are spaced apart by an unthreaded sleeve portion.

When the heating device is to be installed, one of the head bolts of the engine is removed, and the heater is inserted in its place. The heating element proper, that is, coil 4 and the surrounding sleeve 5, being of less diameter than the sleeve 10, passes through the threaded hole in the block *20*, into which threaded section 11 is screwed. The device can be tightened down until the unthreaded portion of the sleeve prevents further turning. A nut *21* can now be applied to threaded section 16 and tightened down on the cylinder head *22*. Thus the device continues to serve the normal function of the head bolt which it displaces, and at the same time serves to heat the water or other cooling fluid in the engine.

When the heating device is inserted in the cylinder head and the power is turned on, the units will heat the block and the liquids therein to a point to enable easy starting such as is possible in warm weather. Usually about thirty minutes are required to warm up an engine in a temperature 30° below zero. However, the time required depends upon the type of engine and the size of the cylinder block.

The unit is economical, requiring relatively little power consumption. Generally, for a 30 day period the units would require about 18 kilowatt-hours of power. When once heated, the engine will remain in good starting condition throughout the day, provided it is not allowed to stand in cold weather for several hours.

While I have described herein one embodiment of my invention, I wish it to be understood that I do not intend to limit myself thereby except within the scope of the claims hereto or hereinafter appended.

I claim:

1. A heating device for internal combustion engines adapted to be inserted therein in lieu of a head bolt, comprising a metal sleeve having spaced threaded portions extending to each end thereof, an electric heating element secured on and extending from one end of the sleeve, and lead-in connections connected to such element extending through the sleeve to the other end thereof, said heating element and connections being insulated from the sleeve.

2. A heating device as claimed in claim 1 in which said heating element is of less diameter than said sleeve.

3. A heating device as claimed in claim 2 in which the threads of such threaded portions are of opposite pitch.

4. A heating device as claimed in claim 1 in which the threads of such threaded portions are of opposite pitch.

5. A heating device for liquid cooled internal combustion engines, comprising a bolt adapted to be mounted in a cylinder head and having a hole therethrough, a porcelain arbor, a coil of high resistance wire wound about the arbor, said arbor having a hole therethrough, a wire passing through the holes in the bolt and arbor and connected to one end of the coil, a second wire passing through the hole in the bolt and connected to the other end of the coil, a metal casing for the coil and arbor, said casing being secured to the bolt, and a cement insulating the coil from the casing.

6. The structure set forth in claim 5 further characterized by the wires passing through the hole in the bolt being insulated, and an insulating cement for holding the wires in position at the upper end of the hole in the bolt.

*7. A heating device for internal combustion engines adapted to be inserted therein in lieu of a head bolt, comprising a metal sleeve having a threaded portion adapted to engage in a threaded hole in the cylinder block and having an electric heating element secured to the sleeve and extending a substantial distance beyond the inner end of such threaded portion, means associated with the other end of the sleeve spaced a substantial distance from such threaded portion to engage the cylinder head for clamping it to the block, and lead-in connections connected to such element extending through the sleeve to the other end thereof, said heating element and connections being insulated from the sleeve.*

*8. In a device as claimed in claim 7, said means being adjustable longitudinally of the sleeve.*

*9. In combination with an internal combustion engine having a cylinder block and a cylinder head provided with aligned holes therein, the hole in the block being threaded, a heating device comprising a sleeve extending through both said holes and threadedly engaging in the hole in the block, an electric heating element secured to the sleeve and extending into the cylinder block beyond said last hole, means associated with the other end of the sleeve engaging the outside of the cylinder head and holding it against the block, and lead-in connections connected to such element extending through the sleeve to the other end thereof, said heating element and connections being insulated from the sleeve.*

ANDREW L. FREEMAN.

REFERENCES CITED

The following references are of record in the file of this patent or in the original patent:

UNITED STATES PATENTS

| Number | Name | Date |
|---|---|---|
| 1,208,756 | De Khotinsky | Dec. 19, 1916 |
| 1,234,973 | Trood | July 31, 1917 |
| 1,320,890 | Moffat | Nov. 4, 1919 |
| 1,360,510 | Elliott | Nov. 30, 1920 |
| 1,642,223 | Boker | Sept. 13, 1927 |
| 1,861,464 | Woodson | June 7, 1932 |
| 1,916,237 | Sloan | July 4, 1933 |
| 2,144,090 | Trice | Jan. 17, 1939 |
| 2,176,601 | Bates | Oct. 17, 1939 |

FOREIGN PATENTS

| Number | Country | Date |
|---|---|---|
| 738,737 | France | Oct. 18, 1932 |
| 749,669 | France | May 8, 1933 |